(12) United States Patent
Jensen et al.

(10) Patent No.: US 7,587,414 B2
(45) Date of Patent: Sep. 8, 2009

(54) COMPONENTIZED CONTENT DELIVERY

(75) Inventors: Matthias Jensen, Heidelberg (DE); Natascha Marienfeld, Heppenheim (DE); Werner Aigner, Willmering (DE)

(73) Assignee: SAP AG, Walldorf (DE)

( * ) Notice: Subject to any disclaimer, the term of this patent is extended or adjusted under 35 U.S.C. 154(b) by 452 days.

(21) Appl. No.: 10/843,950

(22) Filed: May 11, 2004

(65) Prior Publication Data

US 2005/0256902 A1 Nov. 17, 2005

(51) Int. Cl.
*G06F 17/00* (2006.01)

(52) U.S. Cl. .................. 707/103 Y; 707/101; 707/102; 707/203; 707/204

(58) Field of Classification Search ............ 707/1, 707/5, 10, 3, 102, 104.1, 101, 103 R, 103 Y, 707/203, 204; 709/223
See application file for complete search history.

(56) References Cited

U.S. PATENT DOCUMENTS

| | | | | |
|---|---|---|---|---|
| 6,304,259 | B1 * | 10/2001 | DeStefano | 715/805 |
| 6,865,572 | B2 * | 3/2005 | Boguraev et al. | 707/5 |
| 6,983,287 | B1 * | 1/2006 | Jayanti et al. | 707/102 |
| 2003/0195899 | A1 * | 10/2003 | Tsao | 707/104.1 |
| 2004/0024747 | A1 * | 2/2004 | Boguraev et al. | 707/3 |
| 2004/0225636 | A1 * | 11/2004 | Heinzel et al. | 707/1 |
| 2004/0230556 | A1 * | 11/2004 | Mueller et al. | 707/1 |
| 2005/0021536 | A1 * | 1/2005 | Fiedler et al. | 707/100 |
| 2005/0091276 | A1 * | 4/2005 | Brunswig et al. | 707/104.1 |
| 2005/0172018 | A1 * | 8/2005 | Devine et al. | 709/223 |
| 2005/0240621 | A1 * | 10/2005 | Robertson et al. | 707/102 |

OTHER PUBLICATIONS

Robby et al., "Bogor: An Extensible and Highly-Modular Software Model Checking Framework", ACM, Sep. 2003, pp. 267-276.*
Stanley Y. W. Su et al., "In Internet-based negotiation server for e-commerce", ACM, 2001, pp. 72-90.*
Jeffrey Undercoffer et al., "A sercure infrastructure for service discovery and access in pervasive computing", ACM, 2003, pp. 113-125.*

* cited by examiner

Primary Examiner—Thuy N Pardo
(74) Attorney, Agent, or Firm—Mintz Levin Cohn Ferris Glovsky & Popeo P.C.

(57) ABSTRACT

A system and method for application data model content delivery and activation. Delivery of core objects are made separately from the appended objects. In an activation process, a single object is created from each core object and the assigned appends. A customer can use and change each of these single activated objects. In an active version, all necessary appends are collected and assembled. In that way, objects can be easily enhanced for industry or country-specific attributes or fields, or other enhancements. In a development system, the active version includes all appends to ensure a correct runtime behavior.

21 Claims, 4 Drawing Sheets

COMPONENTIZED CONTENT DELIVERY

BACKGROUND

Enterprise software frequently makes use of data models representing business systems and/or processes. For example, a multi-dimensional data model can be used in an online sales system to provide detailed information about each product customer such as name, address, key dates, their roles in each sales process, purchase orders, etc.

Objects have properties (e.g. a description), include references to other objects, and can be represented by a file or a set of relational table entries, for example. Data models are typically structured in an enterprise software product as a core object with various extensions, i.e. relating to all represented industries, countries, languages, etc., and delivered or transported to a customer. However, each customer usually belongs to only one or two industries (or countries, language, etc.), and therefore only requires a small subset of the extensions. Yet, currently all of the extensions are activated at the customer along with each core object, and the customer is burdened with many extensions it neither uses nor needs. The customer must selectively deactivate non-relevant objects from all of the core objects and extensions of the delivered data models.

A highly-integrated data model includes product-specific attributes that are only used with a particular software product. The product attributes may themselves have attributes. When a customer, that does not use the particular software product, has to activate the product-specific attributes (and attributes of the product-specific attributes), errors in the attributes must still be resolved.

No separate transportation currently exists for extensions of the core objects or product-specific attributes. Thus, corrections to a core object will cause all corresponding extensions to be delivered to a customer. This also requires a central system in which to update the core objects and their extensions, so as to avoid different versions or overwriting of the core objects and the different extensions from different sources. Further, modifications to delivered objects by the customer are overwritten when delivery occurs again.

Therefore, an append concept is needed that allows certain core objects with extensions and additional attributes to be delivered and displayed to a customer, such that only the relevant extensions and attributes can be activated and used.

SUMMARY

An information system and method is disclosed in which appends, or extensions of core objects of a data model, are deliverable to a customer as separate objects. Corrections to the core objects will not overwrite all the associated extensions. Further, each time a correction is made to a core object, all of the extensions need not be transported again to the customer. Thus, distributed development of the core objects and the extensions is possible. The system and method can be used for various extended modeling aspects, e.g. for industry-specific extensions, country-specific extensions, or other scenarios.

In one implementation, a method for componentized content delivery of a data model for an application includes enhancing a core object of the data model with one or more appends. Each append includes an object and a pointer to the core object. The method further includes delivering the core object and the one or more appends separately to a customer.

In another implementation, a system for componentized content delivery of a data model for an application includes a core object describing the data model, and one or more appends. Each append includes an object that enhances the core object and a pointer to the core object. The core object and the one or more appends are separately deliverable to a customer for local activation by the customer to execute the data model on the application.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

In an implementation, core objects are enhanced by appends. Appends are separate objects, rather than simple extensions, that include pointers to a core object. For example, one core object "Company" may include attributes "Region" and "Address." For a country-specific application, the core object may need to be enhanced. For instance, for the USA, the core object "Company" may need to be enhanced with the attribute "Owned by a Woman." These attributes are configured as separately-deliverable objects in the form of appends. Because of the separation of core object from appends, a change or correction to the core object does not influence any of the appends. On the other hand, enhancement of a core object by configuring a separate append will not overwrite other appends.

Delivery of the core objects is separate from the appends. In an activation process, a single object is created from each core object and the assigned appends. A customer can use and change each of these single activated objects. Accordingly, the appends only exist in the delivery version—not in the active version. In an active version, all necessary appends are collected and assembled. In that way, objects can be easily enhanced for industry or country-specific attributes or fields, or other enhancements. In a development system, the active version includes all appends to ensure a correct runtime behavior.

Figure 1:
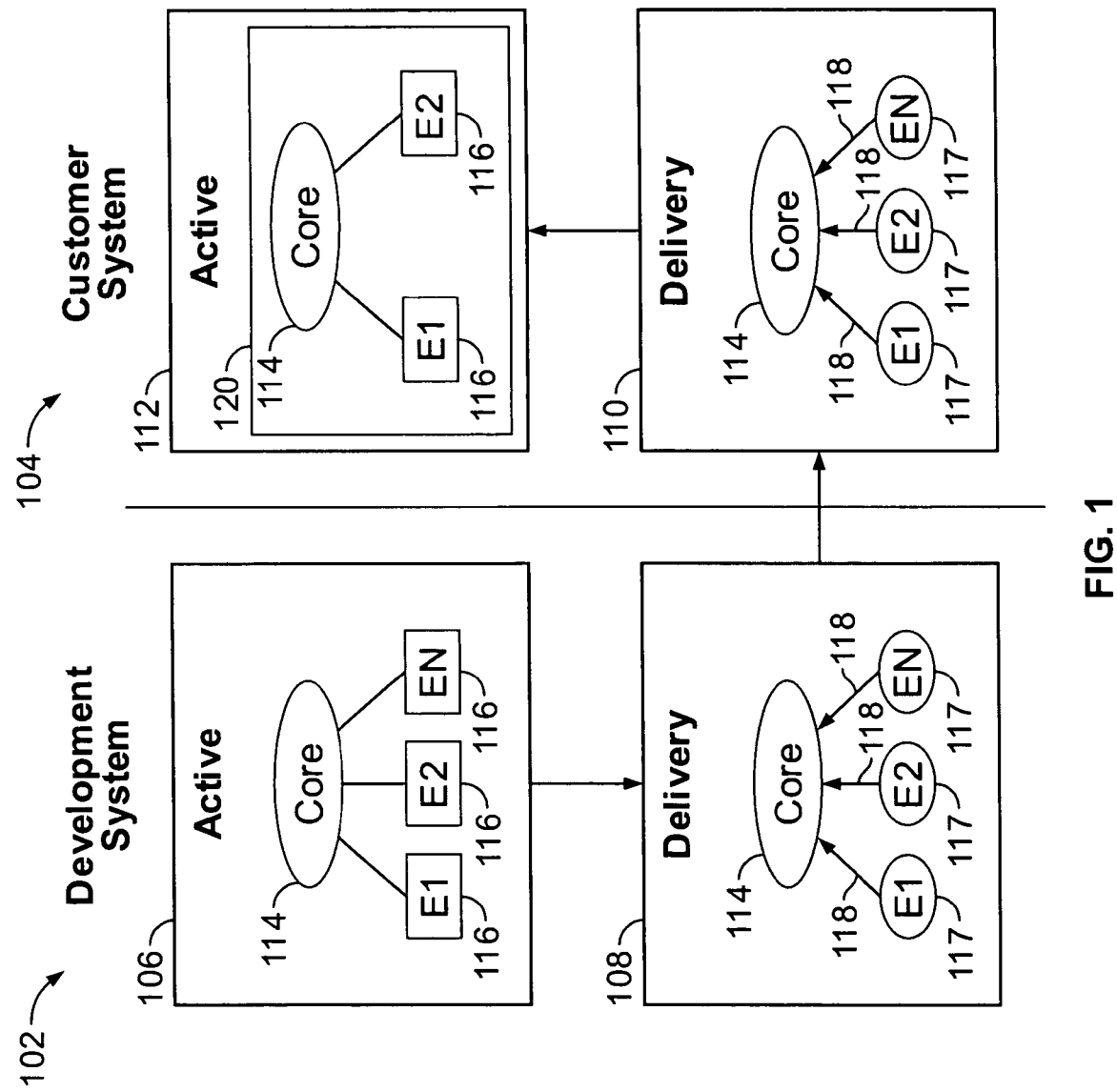
FIG. 1 illustrates a componentized content delivery system.

FIG. 1 illustrates a componentized content delivery system including a development system 102 that delivers data models to a customer system 104. In the development system 102 an active version 106 of the data model includes a core object 114 and extensions E1 ... EN 116 (illustrated as squares). The extensions 116 can be industry-specific extensions to the core object 114, or specific to any other type of extension such as country, language, etc. While FIG. 1 shows extensions E1 to EN, the number N can be any number of one or more. A delivery version 108 of the data model is prepared from the active version 106, in which the extensions 116 are configured as appends 117 (i.e. separate objects illustrated as ovals) each with pointers 118 to the core object 114. The delivery version 108 is delivered to the customer system 104 as a delivery version 110 as separate objects.

In the delivery version 110 all necessary appends 117 are collected and assembled for selective activation in an active version 112. Particular appends 117 (i.e. E1 and E2 only) can be selected for activation via the activated object packages. In the active version, each activated append will be included as an extension 116 of the core object 114 as a single active version object 120.

All objects delivered to the customer can be categorized into different packages. The different packages can be defined in such a way that all objects (core objects and appends) from a particular classification are included. Thus, one package can be made of customer relationship management (CRM) core objects, whereas another package can consist of retail industry-specific objects for CRM or all country-specific objects for a particular country. In the example above, the core object "Company" can be in the "CRM" package, and the country-specific append can be in the "CRM USA" package.

The customer can select certain packages of interest by selectively switching packages on or off. For instance, if the customer is only interested in the "CRM" package, the core object "Company" is activated without the country-specific attribute from the "CRM USA" package. If the customer selects both "CRM" and CRM USA" packages, the core object "Company" is activated with the attributes from both the "CRM" package and the "CRM USA" package. Accordingly, when activating a core object, only the appends of the active components are assembled to the core object. In this way, enhancements for many industries, countries, languages, etc., can be delivered to the customer, and since the customer can selectively choose among packages of interest, the customer is not overloaded or overburdened.

Components of each package can be switched on or off at any time, i.e. with each project that is implemented. Because appends are only compatible enhancements, the components can be switched on even during productive system usage.

Customers and partners can also enhance core objects with their own appends related to their specific enhancement aspects, and deliver a customized solution to their own partners. The first customer or partner need only deliver the appends, and not the main objects, which ensures that the delivery version of core objects is not destroyed or changed by the follow-on delivery from a software vendor or a partner. Customers can also implement centralized customer or partner-specific development, such as using the appends for country-specific aspects that are unique to their company, and delivering these objects to their different subsidiaries.

The use of appends also supports enhancements in multi-level delivery chains. For instance, a partner gets delivery of core objects from the software vendor. The partner enhances these core objects by appends and ships this to a customer. The customer enhances these objects further and ships the enhancements to subsidiaries.

Figure 2:
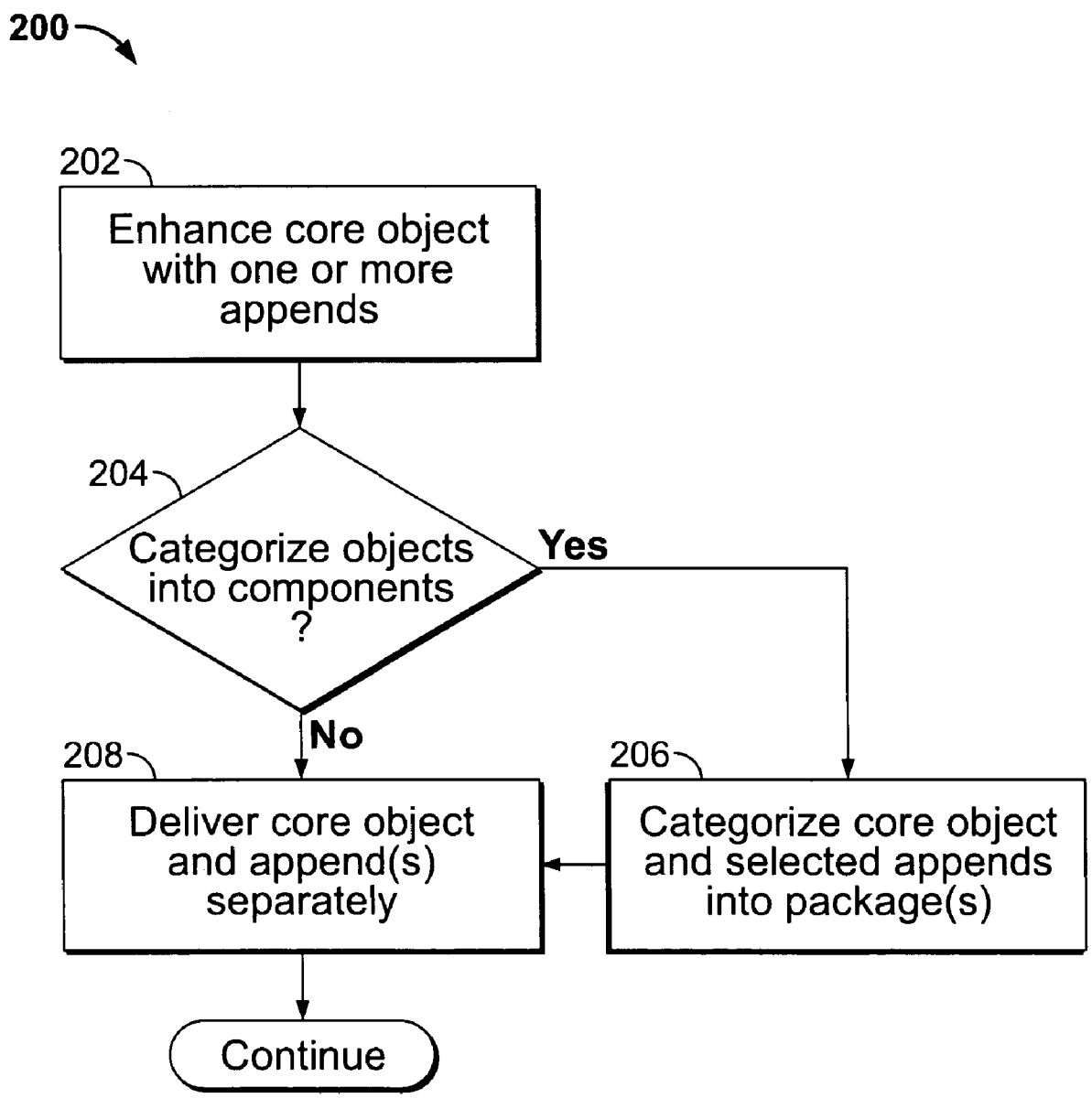
FIG. 2 depicts a method for enhancing and categorizing data models for an application.

FIG. 2 depicts a method 200 for enhancing and categorizing data models for an application such as a business warehouse application. At 202, a vendor builds the data models, in which core objects of the data model are enhanced with one or more appends. Each append is an object that includes a pointer to a core object. At 204, a decision can be made whether to categorize the core object and/or one or more appends into components. If yes, at 206 the core object and selected appends can be categorized into one or more packages. The packages can be defined in a way such at all core objects and appends related to a particular area or process are included. The core object and one or more associated appends can be delivered separately to a customer, at 208.

Figure 3:
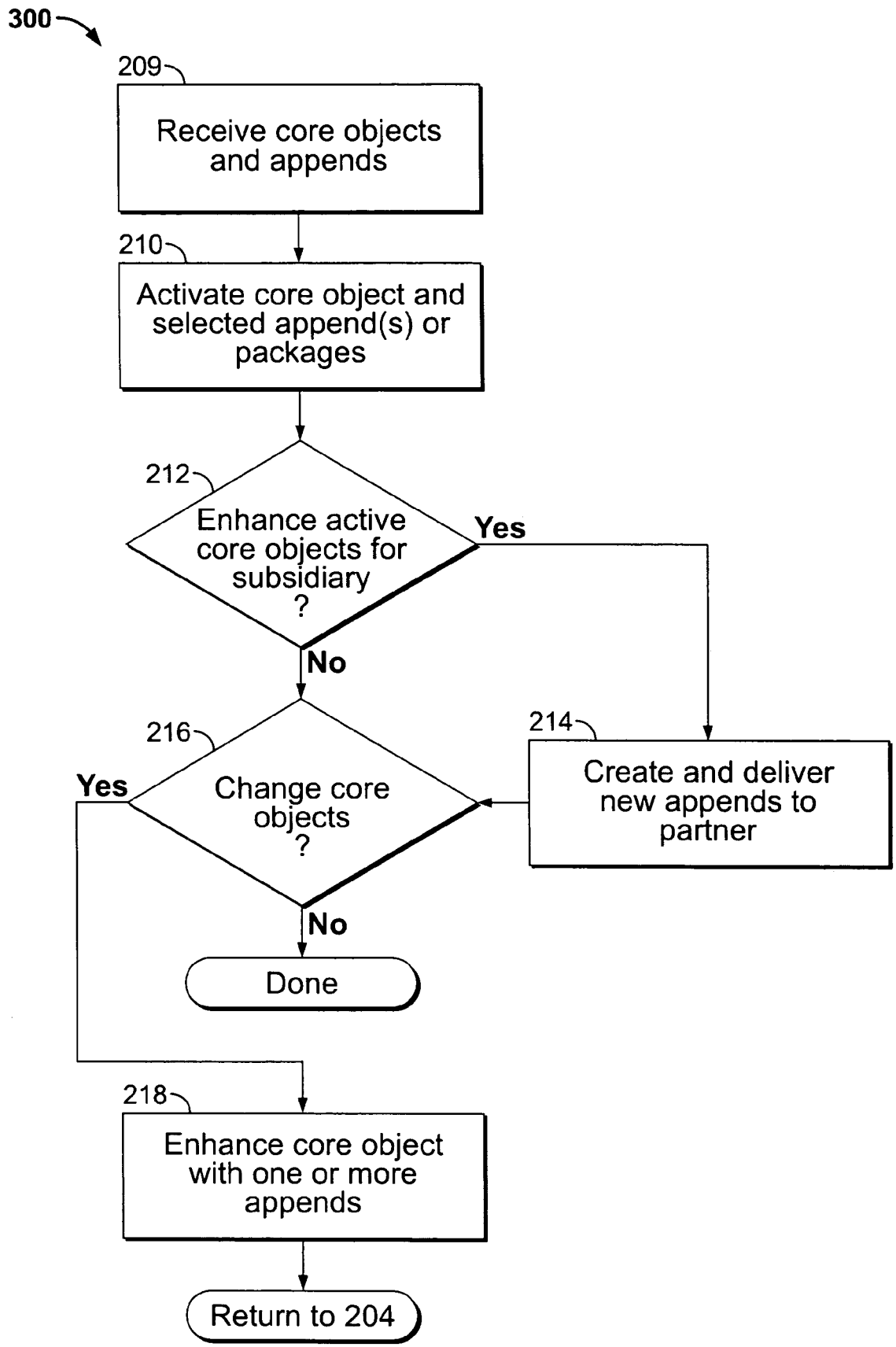
FIG. 3 shows a method for receiving and activating the data models at a customer.

FIG. 3 shows a method 300 for receiving and activating the data models at a customer. At 209, the customer receives the core objects and associated appends from the vendor. The customer can activate the core object and related appends at the package level, at 210, as opposed to having to select from all delivered appends. The customer may decide to further enhance activated core objects and/or appends for partners (i.e. own customers) at 212. Accordingly, object delivery can be scaled in a hierarchical delivery pattern or multi-level delivery chain, without affecting core objects from a development system at the top level of the hierarchy. At 214, a customer can create and deliver new appends to lower-level customers/partners or subsidiaries.

Because of the separation of core objects and appends, changes to the core object to not influence the appends, or vice versa. Thus, at 216 a decision can be made whether to change a core object. If no, the method 300 ends. If yes, the core object can be modified at the development system as shown at 218 without affecting any of the enhancements or appends, and the method can proceed as if at 204 in FIG. 2. Alternatively, the core objects and/or appends can be modified at the customer any time after delivery.

Figure 4:
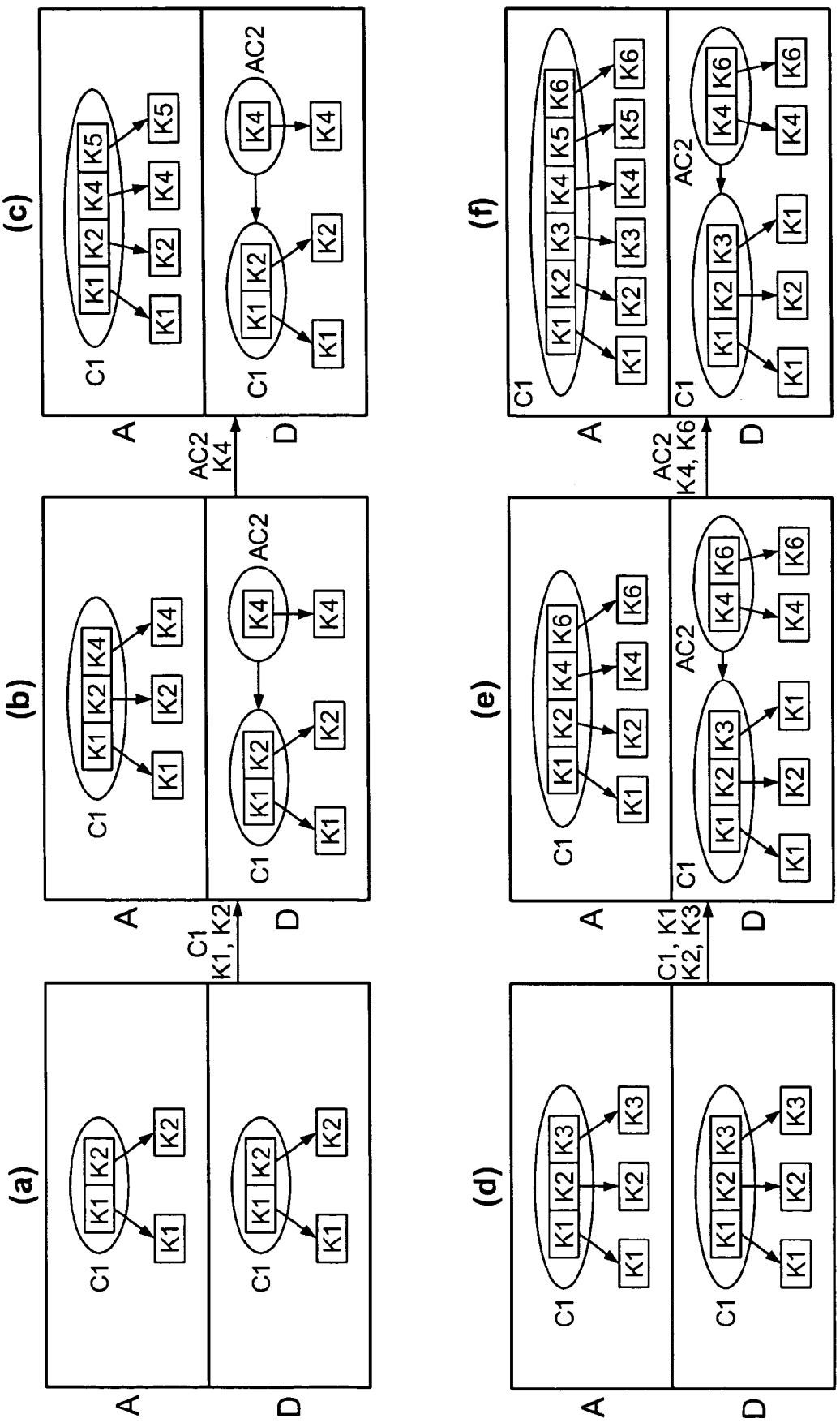
FIG. 4(a)-(f) illustrates an exemplary delivery cycle of a data model.

FIG. 4(*a*)-(*f*) illustrates an exemplary delivery cycle of a data model. At FIG. 4(*a*), the vendor builds a data model having a core object C1 linked with objects K1 and K2. Thus, the activated and delivery versions of the data model are identical. At FIG. 4(*b*), a partner builds an append AC2 linked to object K4, for modification to the delivered core object C1. The partner can activate the append core object AC2 with the core object C1 to form a new appended core object in the activated version. At FIG. 4(*c*), the core object C1 and append AC2 are delivered to a customer, which already has activated the core object C1 and adds object K5.

In FIG. 4(*d*), by way of example, the vendor adds an object K3 to the core object C1. At FIG. 4(*e*) the partner adds object K6 to append AC2, for a new activated core object C1 including objects K1, K2, K4 and K6. The append AC2 is not affected by a new delivery version of C1, as shown in FIG. 4(*f*).

Although a few embodiments have been described in detail above, other modifications are possible. The logic flows depicted in FIG. 2 may be changed without departing from the scope of this description. Other embodiments may be within the scope of the following claims.

The invention claimed is:

1. A computer-implemented method for componentized content delivery of a data model for an application, the method comprising:

enhancing a core object of the data model with one or more appends, each append including one or more objects and a pointer to the core object, the appends enhancing the core object by adding or modifying one or more attributes of the data model, the data model defining structures for instances of objects of the data model;

delivering the core object separate from the one or more appends, the delivering from a first computer system to a customer computer system; and activating the core object and the one or more appends, the activating comprising generating a run-time version of the data model based on a delivery-time version of the data model including the core object with the appends, the run-time version of the data model incorporating the core object and one or more objects of the appends into a single object, the run-time version of the data model being used by the application during execution of the application manipulating instances of objects of the data model while the delivery-time version of the data model is retained for updates and not used during execution of the application manipulating instances of objects of the data model.

2. The method in accordance with claim 1, further comprising:
selecting a subset of the one or more delivered appends for activation;
activating each one of the selected subset of appends with the delivered core object.

3. The method in accordance with claim 2, wherein activating each one of the selected appends with the delivered core object further includes creating a new object including the core object and one of the selected appends.

4. The method in accordance with claim 1, further comprising categorizing the delivered core object and one or more appends into a predefined package.

5. The method in accordance with claim 4, further comprising activating the delivered core object and at least a subset of the one or more appends in accordance with the predefined package.

6. The method in accordance with claim 4, wherein the predefined package is configured to be switchable on or off.

7. The method in accordance with claim 1, further comprising creating one or more new appends to further enhance the delivered core object.

8. The method in accordance with claim 7, further comprising delivering the one or more new appends to a subsidiary of the customer.

9. The method in accordance with claim 1, wherein:
the core object is enhanced with a plurality of appends.

10. A computer program product for directing a processor to execute componentized content delivery of a data model for an application, the computer program product comprising code configured to:
during design-time of the data model of the application, enhance a core object of the data model with one or more appends, each append including one or more objects and a pointer to the core object, the appends to enhance the core object by adding or modifying one or more attributes of the data model, the data model defining structures for instances of objects of the data model manipulated by the application being enterprise software;
during delivery-time of the data model of the application, deliver the core object separate from the one or more appends, the delivering from a first computer system to a customer computer system; and
activate the core object and the one or more appends, the activating comprising generating a run-time version of the data model based on a delivery-time version of the data model including the core object with the appends, the run-time version of the data model incorporating the core object and one or more objects of the appends into a single object, the run-time version of the data model being used by the application during execution of the application manipulating instances of objects of the data model while the delivery-time version of the data model is retained for updates and not used during execution of the application manipulating instances of objects of the data model.

11. The computer program product in accordance with claim 10, wherein the code is further configured to:
select a subset of the one or more delivered appends for activation
activate each one of the selected subset of appends with the delivered core object.

12. The computer program product in accordance with claim 11, wherein the code is further configured to create a new object, and wherein the new object includes the core object and one of the selected appends.

13. The computer program product in accordance with claim 10, further comprising categorizing the delivered core object and one or more appends into a predefined package.

14. The computer program product in accordance with claim 13, wherein the code is further configured to activate the delivered core object and at least a subset of the one or more appends in accordance with the predefined package.

15. The computer program product in accordance with claim 14, wherein the code is further configured to switch the predefined package on or off based on a user input.

16. The computer program product in accordance with claim 10, wherein the code is further configured to create one or more new appends to further enhance the delivered core object.

17. The computer program product in accordance with claim 16, wherein the code is further configured to deliver the one or more new appends to a subsidiary of the customer.

18. A system for componentized content delivery of a data model for an application, the system comprising:
a processor;
and a memory configured to provide a method comprising:
enhancing a core object of the data model with one or more appends, each append including one or more objects and a pointer to the core object, the appends enhancing the core object by adding or modifying one or more attributes of the data model, the data model defining structures for instances of objects of the data model;
delivering the core object separate from the one or more appends, the delivering from a first computer system to a customer computer system; and
activating the core object and the one or more appends, the activating comprising generating a run-time version of the data model based on a delivery-time version of the data model including the core object with the appends, the run-time version of the data model incorporating the core object and one or more objects of the appends into a single object, the run-time version of the data model being used by the application during execution of the application manipulating instances of objects of the data model while the delivery-time version of the data model is retained for updates and not used during execution of the application manipulating instances of objects of the data model.

19. The system in accordance with claim 18, further comprising a user interface configured to represent a delivered core object and the one or more appends.

20. The system in accordance with claim 19, further comprising a computer program product configured to receive input from the user interface to activate the core object and selected ones of the one or more appends.

21. A computer-implemented method comprising:
receiving a first version of a core object of a data model, the data model defining structures for instances of objects of the data model manipulated by an application being enterprise software;
activating the first version of the core object to generate a first run-time version of the core object in a first run-time version of the data model;
receiving, separate from the first version of the core object, a first version of a first append, the first append being an extension of the core object, the first append including first one or more objects and a pointer to the core object, and the first append to enhance the core object by adding or modifying a first one or more attributes of the data model with the first one or more objects;

activating the first append for the first version of the core object to add the first objects to the core object, the activating the first append to generate a second run-time version of the core object including the extension of the first append as a single object of a second run-time version of the data model;

receiving, separate from the first version of the core object and the first version of the first append, a second version of the first append, the second version of the first append being an extension of the core object, the second version of the first append including second one or more objects and a pointer to the core object, and the second version of the first append to enhance the core object by adding or modifying a second one or more attributes of the data model;

activating the second version of the first append for the first version of the core object to add the extension of the second append to the core object, the activating excluding extension of the first append from a third run-time version of the data model;

generating a second version of the core object defining attributes of instances of an object differently from the first version of the core object, the second version of the core object not affecting the first and second versions of the first append;

receiving, separate from the first version of the core object and the first and second versions of the first append the second version of the core object; and activating the second version of the first append for the second version of the core object to add the extension of the second version of the first append to the second version of the core object, the activating excluding the extension of the first version of the first append and objects of the first version of the core object from a fourth run-time version of the data model.

* * * * *

UNITED STATES PATENT AND TRADEMARK OFFICE
CERTIFICATE OF CORRECTION

PATENT NO. : 7,587,414 B2 Page 1 of 1
APPLICATION NO. : 10/843950
DATED : September 8, 2009
INVENTOR(S) : Jensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 594 days.

Signed and Sealed this

Twenty-first Day of September, 2010

David J. Kappos
*Director of the United States Patent and Trademark Office*